(12) United States Patent
Kettler

(10) Patent No.: US 6,364,082 B1
(45) Date of Patent: Apr. 2, 2002

(54) FREEWHEEL CLUTCH AND A METHOD OF TRANSMITTING POWER USING A FREEWHEEL CLUTCH

(75) Inventor: Heinz Kettler, Ense-Parsit (DE)

(73) Assignee: Heinz Kettler GmbH & Co., Ense-Parsit (DE)

( * ) Notice: Subject to any disclaimer, the term of this patent is extended or adjusted under 35 U.S.C. 154(b) by 0 days.

(21) Appl. No.: 09/584,495

(22) Filed: Jun. 1, 2000

(30) Foreign Application Priority Data

Jan. 20, 2000 (DE) .......................................... 100 02 334

(51) Int. Cl.$^7$ ............................................... F16D 41/08
(52) U.S. Cl. ........................... 192/43.2; 192/71; 192/76
(58) Field of Search ........................ 192/43, 43.1, 43.2, 192/54.5, 71, 75, 76

(56) References Cited

U.S. PATENT DOCUMENTS

| | | | |
|---|---|---|---|
| 1,128,465 A | | 2/1915 | Lasley |
| 1,806,340 A | * | 5/1931 | Francis .................. 192/43.2 X |
| 2,181,665 A | | 11/1939 | Messamore |
| 2,395,576 A | * | 2/1946 | Moroney ................... 192/43.1 |
| 3,599,767 A | | 8/1971 | Sederquist |
| 3,952,617 A | * | 4/1976 | Gregg ................... 192/43.1 X |
| 4,063,626 A | * | 12/1977 | Solomon ............... 192/43.1 X |
| 4,458,595 A | | 7/1984 | Gerrish, Jr. et al. |
| 4,458,795 A | * | 7/1984 | Norton ...................... 192/43.2 |
| 4,520,697 A | * | 6/1985 | Moetteil ................ 192/43.1 X |
| 4,574,928 A | | 3/1986 | Norton |

FOREIGN PATENT DOCUMENTS

| | | |
|---|---|---|
| AU | 194253 | 1/1958 |
| DE | 885331 | 8/1953 |
| DE | 1625730 | 2/1972 |
| DE | 3326420 | 1/1985 |

OTHER PUBLICATIONS

An English Language abstract of DE 33 26 420.

* cited by examiner

Primary Examiner—Richard M. Lorence
(74) Attorney, Agent, or Firm—Greenblum & Bernstein, P.L.C.

(57) ABSTRACT

The present invention relates to a freewheel clutch and a method transmitting power from one shaft to another. The freewheel clutch which is shiftable in two rotational directions includes a drive shaft which can rotate in each of two directions, a catch element which is fixedly secured to the drive shaft, a driven shaft, an engagement mechanism arranged between the drive shaft and the driven shaft, a fixed member, a holding element frictionally engaging the fixed member, and a spring element biased to release the engagement mechanism from engagement with the driven shaft. The method of transmitting power utilizing the freewheel clutch includes rotating the drive shaft from a freewheel position in one of a clockwise and a counterclockwise direction, whereby the engagement mechanism is moved into an engagement position so as to rotate the driven shaft, and returning the drive shaft to the freewheel position.

72 Claims, 2 Drawing Sheets

FREEWHEEL CLUTCH AND A METHOD OF TRANSMITTING POWER USING A FREEWHEEL CLUTCH

CROSS-REFERENCE TO RELATED APPLICATIONS

The present application claims priority under 35 U.S.C. § 119 of German Patent Application No. 100 02 334.7, filed on Jan. 20, 2000, the disclosure of which is expressly incorporated by reference herein in its entirety.

BACKGROUND OF THE INVENTION

1. Field of the Invention

The present invention relates to a freewheel clutch which is shiftable in two rotational directions. The invention also relates to a method of transmitting power using a freewheel clutch which is shiftable in two rotational directions.

2. Background of the Invention

Freewheel clutches or freewheels are in particular known in bicycle engineering. Austrian application AT-194253, for instance, discloses a freewheel and gear hub having a back-pedal brake for bicycles wherein ratchets operate without any noise. These ratchets are controlled by a friction sleeve which frictionally slides in the sleeve or in an annular member which is fixedly connected to the hub sleeve. The friction sleeve includes recesses for the ratchets, noses for limiting the rotation, and frictional slide springs which rest on the annular member.

Furthermore, U.S. Pat. No. 2,181,665 shows a simple construction of a freewheel acting in one direction. In this design, a spring-biased ratchet engages into recesses which are provided for the ratchet upon rotation of the hub in one rotational direction. However, it does not engage into the recesses upon rotation in the other rotational direction.

Furthermore, German application DE-3326420 shows a freewheel clutch which utilizes a driving clutch, half which includes two axially offset eccentrics. However, the freewheel clutch is only intended for transmitting a rotational movement from a drive element to a driven element in one direction of rotation. Moreover, an independent free rotational movement of the driven element is ensured in the same direction of rotation when the speed thereof exceeds that of the drive element.

Despite the great number of solutions offered in the field of bicycles or similar devices, there continues to exist a need for a freewheel clutch which can be utilized, in particular, in pedal vehicles for children such as tricycles or Kettcars® which allow pedaling in both the forward direction and the rearward direction from an initial inoperative position. Such a design should easily permit both a forward movement and a rearward movement, respectively, of the vehicle. Furthermore, there is also a need for a freewheeling design which acts in both directions and prevents the pedals from rotating, for instance, during travel in sloping terrain or while the vehicle is being pushed. Moreover, since a pedal drive acts in both directions, the freewheel must also be operative in both directions for reasons of safety. Accordingly, such a design may make these devices safer by preventing a user from injuring their legs or feet on the pedals.

SUMMARY OF THE INVENTION

The present invention provides for a freewheel clutch of simple construction and relatively low manufacturing costs which is shiftable in both rotational directions and includes a freewheel condition which acts in both rotational directions.

According to the invention there is provided a freewheel clutch which is shiftable in both rotational directions, e.g., forwards or backwards, clockwise or counterclockwise, etc., and which includes a double-acting freewheel. The clutch includes a driver or catch which is fixedly and/or securely connected to a drive shaft and further includes an engagement mechanism which is arranged between the drive shaft and a driven shaft.

Additionally, the freewheel clutch utilizes a holding element which engages the engagement mechanism and which is frictionally engaged with or frictionally coupled to a fixed member which may be a vehicle frame. A spring element is utilized in the clutch such that in the inoperative state of the drive shaft, the engagement mechanism is maintained out of engagement with the driven shaft. However, in the driven state of the drive shaft, the engagement mechanism is placed into engagement with the driven shaft via the catch.

Prior to engagement of the engagement mechanism with the driven shaft, the engagement mechanism is engaged by the holding element in a non-rotating or stationary state, while the drive shaft and the catch are rotating due to pedaling. A frictional force, which is maintained between the holding element and the fixed member, is designed to be greater than a resilient force which is exerted by the spring element. This design permits the engagement of the engagement mechanism with the driven shaft when the drive shaft is rotated a predetermined amount. Furthermore, the clutch utilizes an engagement force which is created between the engagement mechanism and the driven shaft, which is greater than the frictional force between holding element and fixed member. Accordingly, as a result of this design, a power transmission from the drive shaft to the driven shaft via the catch and the engagement mechanism is thereby made possible.

Thus, according to the invention, it is possible to drive the drive shaft forwards or rearwards (i.e., clockwise or counterclockwise) by pedaling a pedal vehicle. Moreover, this design easily achieves a forwardly directed movement or a rearwardly directed movement of the vehicle, depending on the respective drive direction of the drive shaft and/or pedals. Thus the freewheel clutch according to the invention can be shifted into both rotational directions based upon movement of the pedals in the corresponding directions.

Furthermore, the invention provides a double-acting freewheel which makes it possible to move the pedal vehicle forwards or rearwards without pedaling. Accordingly, this design allows the pedals to remain stationary (e.g., not caused to be rotated) when the vehicle is pushed in either direction. Thus, when the vehicle is pushed in a forward direction, this movement will not cause forward corresponding movement of the pedals in the forward direction and vise versa. It is thus in particular possible to push pedal vehicles with children thereon forwards or rearwards without producing any rotation of the pedals. As a result, the risk of injury to the child's feet or legs is thereby reduced.

Preferably, the engagement mechanism which is located between the drive shaft and the driven shaft is designed such that it permits a positive lock or positive engagement between a driving part and a driven part. This positive engagement design ensures a reliable connection between the driving and the driven part. However, the invention also contemplates the use of frictional engagement by the engagement mechanism between the driving part and the driven part. Such a design allows for an even simpler construction of the freewheel clutch. Of course, in each of these embodiments, the frictional force between the engagement mechanism and the driven shaft must be greater than the frictional force between the holding element and the fixed member.

Preferably, the driven shaft is designed as an internally splined hollow shaft. This allows for a compact freewheel clutch which is saves space, in particular, in the axial direction.

In order to provide for a simple construction of the freewheel clutch, the spring element is preferably designed as a spring washer or ring. The ring or washer may have an entirely annular shape or may be designed as a split ring or split washer so as to permit easy mounting and/or assembly/disassembly.

Advantageously, the engagement mechanism may be designed as a locking spline having external teeth or toothing. This design permits a reliable positive teeth to teeth engagement so as to connect or couple the drive shaft to the driven shaft.

In order to obtain a redundant engagement between the drive shaft and the driven shaft, the engagement mechanism may include two locks or engagement elements in which each engagement element utilizes an external spline, teeth or toothing.

Additionally, it is preferred that the catch is designed as a semi-annular element having two lateral wing sections. Utilizing this design, the semi-annular element part of the catch can easily be connected to the drive shaft, e.g. by conventional attachment techniques such as welding, bonding, fasteners, etc., or any combination thereof.

Moreover, in order to help reduce the risk of injury, a certain amount of motional or rotational play should exist in the drive shaft prior to the drive shaft being placed into engagement with the driven shaft. The amount of play can of course be varied for the particular purpose. However, it is preferred that this play be a total of approximately 30°. Accordingly, this design allows the pedals also have a motional or rotational play of approximately ±15° in either direction and around an axis running through the drive shaft. Again, this allows for a total motional or rotational play of the pedals of approximately 30°. Stated another way, starting from a central or initial position, the pedals can be moved or rotated forwards by approximately 15° and rearwards by approximately 15° without the drive shaft causing corresponding movement or rotation of the driven shaft.

In order to limit the movement of the catch in axial direction, at least one of the engagement elements of the engagement mechanism advantageously includes inwardly projecting noses. Preferably, the holding element which cooperates with the engagement mechanism is designed as an annular or ring-like fork which has at least one engagement or projection arm. Moreover, a fiber friction disk or friction washer is arranged as a friction-producing element between the annular fork and the fixed member. This design permits a particularly axially compact construction. Moreover, the fiber friction washer is designed such that it can easily be replaced in case of wear.

The invention therefore provides for a freewheel clutch which is shiftable in two rotational directions, the clutch including a drive shaft which can rotate in each of two directions, a catch element which is fixedly secured to the drive shaft, a driven shaft, an engagement mechanism arranged between the drive shaft and the driven shaft, a fixed member, a holding element frictionally engaging the fixed member, and a spring element biased to release the engagement mechanism from engagement with the driven shaft. The clutch may be a double-acting freewheel clutch. The force of engagement between the engagement mechanism and the driven shaft may be greater than a frictional force produced by the frictional engagement between the fixed member and the holding element. The frictional force produced by the frictional engagement between the fixed member and the holding element may be greater than a resilient force which prevents the engagement mechanism from engaging the driven shaft. The spring element may bias the engagement mechanism towards an axis of the drive shaft. The engagement mechanism may comprise at least two engagement elements. The spring element may bias the at least two engagement elements towards an axis of the drive shaft. The engagement mechanism may comprise a friction engaging surface for frictionally engaging the driven shaft. The friction engaging surface may comprise at least one tooth. The friction engaging surface may comprise a plurality of teeth. The driven shaft may comprise a friction engaging surface having at least one tooth. The at least one tooth of the driven shaft may be adapted to engage the at least one tooth of the engagement mechanism. Rotation of the drive shaft may cause corresponding rotation of the driven shaft when the at least one tooth of the engagement mechanism engages the at least one tooth of the driven shaft.

The driven shaft may comprise a hollow shaft having a plurality of an internal spline and a plurality of internal teeth. The spring element may comprise one of a spring washer and spring ring. The spring element may comprise one of a split spring washer and split spring ring. The engagement mechanism may comprise one of an external spline and a plurality of external teeth for engaging the driven shaft. The engagement mechanism may comprise at least two engagement elements, each of the at least two engagement elements having one of an external spline and a plurality of external teeth for engaging the driven shaft. The catch element may comprise a semi-annular section having two lateral wing sections projecting therefrom. The semi-annular section may be fixedly secured to an exterior surface of the drive shaft. The semi-annular section may be fixedly secured to an exterior surface of the drive shaft by one of welding and boding.

The drive shaft may be adapted to rotate approximately 15° in a clockwise direction before the engagement mechanism engages the driven shaft. The drive shaft may be adapted to rotate approximately 15° in a counterclockwise direction before the engagement mechanism engages the driven shaft. The drive shaft may be adapted to rotate approximately 15° in each of a clockwise and a counterclockwise direction before the engagement mechanism engages the driven shaft. The engagement mechanism may comprise at least one engagement element, the at least one engagement element including at least one projecting portion. The at least one projecting portion may comprise a stop for preventing the catch element from moving in the axial direction. The at least one projecting portion may comprise at least two projecting portions. The fixed member may comprises a sleeve. The sleeve may comprise an annular shoulder which frictionally engages the holding element. The sleeve may comprise an opening for receiving the drive shaft.

The holding element may comprise an annular fork. The annular fork may comprises a washer portion and at least one arm projecting from the washer section. The at least one arm may be adapted to engage at least one slot in the engagement mechanism. The at least one arm may comprise at least two arms, each of the at least two arms being adapted to engage a corresponding slot in the engagement mechanism.

The clutch may further comprise a friction washer arranged between the holding element and the fixed member. The friction washer may be arranged between the holding element and an annular shoulder of the fixed member. The friction washer may comprise one of a fiber washer and a fiber lined washer. The clutch may further comprise one of a spring washer and a corrugated washer arranged against the holding member. The clutch may further comprise a cover for enclosing the engagement mechanism. The clutch may further comprise a securing disk for securing the cover to the fixed member. Rotation of the drive shaft in at least one direction may cause the engagement mechanism to engage the driven shaft. The clutch may comprise a pedal vehicle clutch.

The invention also provides for a freewheel clutch which is shiftable in two rotational directions, the clutch including a first shaft which can rotate in each of two directions, a second shaft comprising a hollow space, an opening for receiving the first shaft, and an internal friction surface, an engagement mechanism arranged within the hollow shape, the engagement mechanism comprising an exterior friction surface, a catch element fixedly secured to the drive shaft, a fixed member comprising an opening for receiving the first shaft and an annular shoulder, a holding element for frictionally engaging the annular shoulder of the fixed member, and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft.

The clutch may be a double-acting freewheel clutch. The force of engagement between the engagement mechanism and the second shaft may be greater than a frictional force produced by the frictional engagement between the fixed member and the holding element. The frictional force produced by the frictional engagement between the fixed member and the holding element may be greater than a resilient force which prevents the engagement mechanism from engaging the second shaft. The engagement mechanism may comprise at least two engagement elements. The external friction surface may comprise at least one tooth. The at least one tooth may comprise a plurality of teeth. The internal friction surface may comprise one of an internal spline and a plurality of teeth. The at least one tooth of the engagement mechanism may be adapted to engage one of the internal spline and the plurality of teeth. Rotation of the first shaft may cause corresponding rotation of the second shaft when the at least one tooth of the engagement mechanism engages one of the internal spline and the plurality of teeth of the second shaft.

The spring element may comprise one of a split spring washer and a split spring ring. The engagement mechanism may comprise at least two engagement elements, each of the at least two engagement elements comprising the external friction surface, the external friction surface further comprising one of an external spline and a plurality of external teeth for engaging a corresponding spline or teeth disposed on the internal friction surface of the second shaft. The catch element may comprise a semi-annular section having two lateral wing sections projecting therefrom. The semi-annular section may be fixedly secured to an exterior surface of the first shaft by one of welding and boding. The first shaft may be adapted to rotate approximately 15° in a clockwise direction before the engagement mechanism engages the second shaft. The first shaft may be adapted to rotate approximately 15° in a counterclockwise direction before the engagement mechanism engages the second shaft. The first shaft may be adapted to rotate approximately 15° in each of a clockwise and a counterclockwise direction before the engagement mechanism engages the second shaft. The engagement mechanism may comprise at least one engagement element, the at least one engagement element including at least one projecting portion. The at least one projecting portion may comprise at least two projecting portions.

The holding element may comprise an annular fork, the annular fork comprising a washer portion and at least one arm projecting from the washer section. The at least one arm may be adapted to engage at least one slot in the engagement mechanism. The at least one arm may comprise at least two arms, each of the at least two arms being adapted to engage a corresponding slot in the engagement mechanism.

The clutch may further comprise a friction washer arranged between the holding element and the annular shoulder of the fixed member. The friction washer may comprise one of a fiber washer and a fiber lined washer. The clutch may further comprise one of a spring washer and a corrugated washer arranged against the holding member. The clutch may further comprise a cover for enclosing the engagement mechanism. The clutch may further comprise a securing disk for securing the cover to the fixed member. The clutch may further comprise a friction washer arranged between the holding element and the annular shoulder of the fixed member, the friction washer comprises one of a fiber washer and a fiber lined washer, one of a spring washer and a corrugated washer arranged against the holding member, a cover for enclosing the engagement mechanism, and a securing disk for securing the cover to the fixed member, wherein the holding element comprises an annular fork, the annular fork comprising a washer portion and at least two arms, each of the at least two arms being adapted to engage a corresponding slot in the engagement mechanism. The clutch may comprises a pedal vehicle clutch.

The invention also provides for a method of transmitting power from a drive shaft to a driver shaft utilizing a freewheel clutch which is shiftable in two rotational directions wherein the drive shaft is rotatable in each of two directions, the clutch including a catch element which is fixedly secured to the drive shaft, an engagement mechanism arranged between the drive shaft and the driven shaft, a fixed member, a holding element frictionally engaging the fixed member, and a spring element biased to release the engagement mechanism from engagement with the driven shaft, the method comprising rotating the drive shaft from a freewheel position in one of a clockwise and a counterclockwise direction, whereby the engagement mechanism is moved into an engagement position so as to rotate the driven shaft, and returning the drive shaft to the freewheel position. The drive shaft may be rotatable in each of the clockwise and counterclockwise direction. The driven shaft may be freely rotating in one of the clockwise and the counterclockwise direction prior to the rotating of the drive shaft.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIGS. 1 to 4 show a preferred embodiment of a freewheel clutch according to the invention utilizing a double-acting freewheel (i.e., one acting in both clockwise and counterclockwise rotational directions). The freewheel clutch 1 permits the transmission of power in both rotational directions, i.e., forwards and rearwards or clockwise and counterclockwise. Freewheel clutch 1 is particularly suited for use in, e.g., tricycles and Kettcars® or other devices where it is advantageous to utilize freewheeling as well as forward and rearward shifting.

Figure 1:
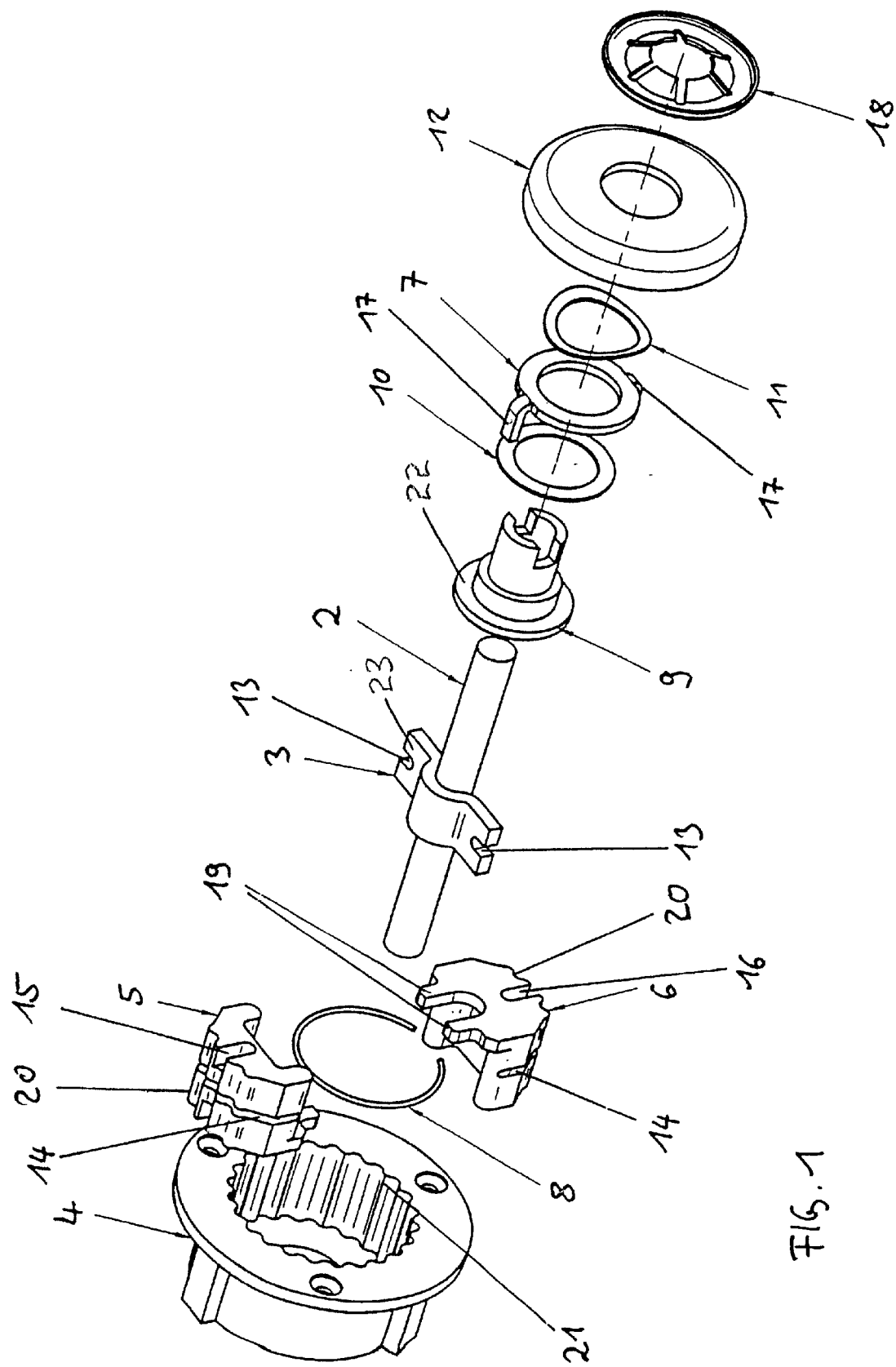
FIG. 1 is a perspective exploded view of a freewheel clutch with a double-acting freewheel according to a preferred embodiment of the present invention.

As is particularly shown in FIG. 1, freewheel clutch 1 utilizes a drive shaft 2 and a driven shaft 4. Drive shaft 2 may be coupled to or communicate with a tread or crank with pedals (not shown). Moreover, drive shaft 2 may be rotated by a force exerted on such pedals. Drive shaft 2 is also designed to be driven in both rotational directions (i.e., clockwise and counterclockwise) so as to permit a forward movement and rearward movement, respectively, of the vehicle, e.g., a pedal operated vehicle.

Freewheel clutch 1 also includes a driver or catch element or mechanism 3 which is fixedly and/or securely connected to drive shaft 2. Catch element 3 preferably includes a semi-annular section having two lateral wing sections projecting therefrom. Each wing section 23 also has a recess or slot 13 which cooperates with split ring 8 as will be more clearly described further on. The connection between catch 3 and shaft 2 is preferably by way of welding or bonding, but other conventional attachment techniques may also be employed. It is preferred that shaft 2 and catch 3 be made of a metal, e.g., steel. However, other materials such as plastics and/or composites may also be utilized provided they contain sufficient strength to perform their function reliably.

Furthermore, clutch 1 utilizes an engagement mechanism which may have two engagement elements or locking elements 5, 6 and which are arranged between drive shaft 2 and driven shaft 4. Engagement elements 5, 6 are preferably designed as locking elements such that each has an external spline or toothing 20. Again, the preferred material for these elements 5, 6 is a metal such as steel, but other materials may also be utilized. Alternatively, teeth 20 may be replaced with a friction surface or lining such as one found on some conventional centrifugal clutches. In this regard, this surface or lining may be similar to the fiber material utilized in fiber washer 10 which will be described further on. Nevertheless, teeth 20 are preferred over a frictional lining or surface because of their long life and reliability.

Furthermore, freewheel clutch 1 according to the invention also utilizes a split ring or spring washer 8 which acts as a spring element to bias locking elements 5 and 6 towards one another. Moreover, spring element 8 is received in recesses or grooves 14 which are respectively formed on each of locking elements 5 and 6. As shown in FIG. 1, a ring-like fork 7 is utilized which includes two projecting arms 17. Each projecting arm 17 is designed to project into recesses or slots 15, 16 formed on locking elements 5 and 6, respectively (see, in particular, FIG. 4).

As shown in FIG. 1, locking elements 5, 6 are preferably not symmetrically formed. Thus, in contrast to locking element 5, locking element 6 can additionally include two projecting noses 19, which project towards locking element 5.

Furthermore, freewheel clutch 1 also includes a sleeve 9 which may be a fixed member, and a fiber disk or washer 10. Fiber washer 10 is preferably a compression friction washer. Moreover, washer 10 is arranged between sleeve 9, more particularly annular shoulder 22 of sleeve 9, and fork 7. Sleeve 9 may further be fixedly connected to a non-rotatable member such as the frame of the pedal vehicle (not shown).

Freewheel clutch 1 according to the invention additionally includes a corrugated washer 11 or similar type spring and/or compression washer, a cover 12, and a securing disk 18 or similar type device which secures and/or helps retain the aforementioned individual members on drive shaft 2 in such a manner that the members cannot be displaced axially.

The operation of the freewheel clutch according to the invention may be described as follows. As is especially shown in FIGS. 2 and 3, catch 3 is arranged between locking elements 5 and 6. Locking elements 5, 6 are in turn biased by spring element 8 to a predetermined extent and held around catch 3 and drive shaft 2, respectively, such that locking elements 5 and 6 are in contact with catch 3.

Accordingly, catch 3, and more particularly wing sections 23, include recesses or slots 13. Moreover, slots 13 are arranged at a particular position on catch 3, for the purpose of receiving annular spring 8. Additionally, the above-explained structures are preferably arranged in the axial direction of the rotational axis A inside a portion of driven shaft 4. For this purpose, driven shaft 4 is designed as a hollow shaft (see for example FIG. 4). As further shown in FIG. 4, the two arms 17 of fork 7 are designed to axially grip or extend beyond fiber washer 10 and annular shoulder 22 of sleeve 9, into recesses or slots 15 and 16, which are formed on each of locking elements 5 and 6 respectfully. Moreover, fork 7 is designed to be held or retained in an axial position or location by securing disk 18 via corrugated washer 11 and cover 12 (see FIG. 4).

Figure 3:
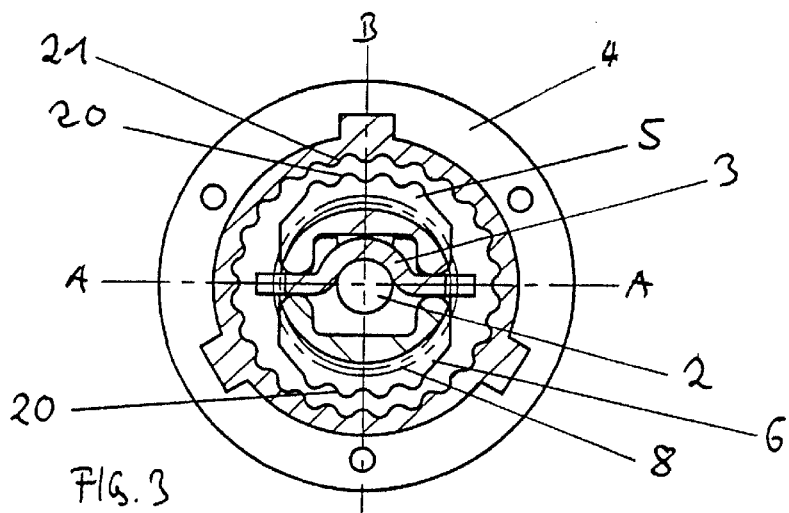
FIG. 3 is a sectional view corresponding to FIG. 2, which shows the freewheel clutch illustrated in FIG. 1 in the opened state of the freewheel, e.g., initial non-rotated state.
Figure 4:
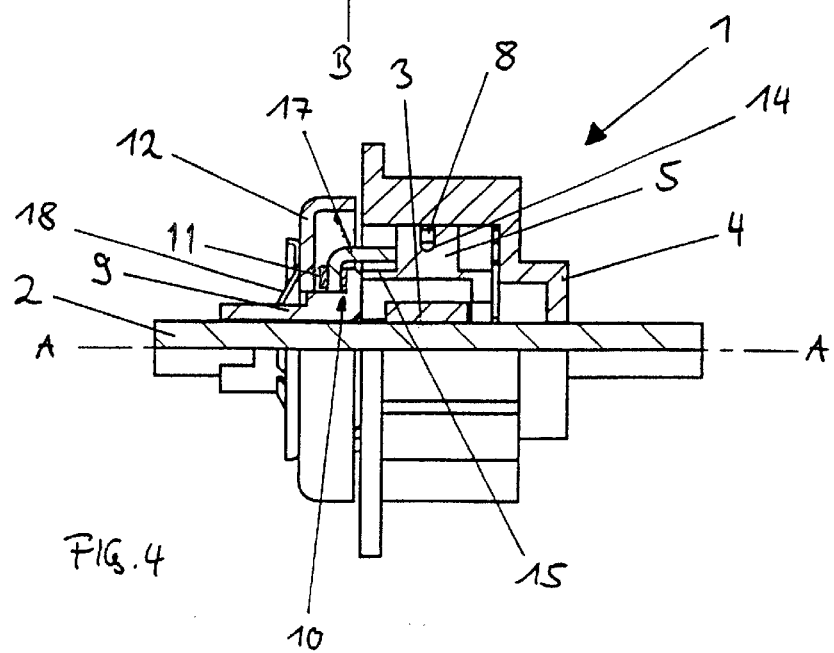
FIG. 4 is a partial sectional side view of the assembled freewheel clutch shown in FIGS. 1 to 3.

In FIG. 3, freewheel clutch 1 is illustrated in a state where the freewheel is opened, i.e., initial non-rotated position. This means that no force is exerted on the pedals such that the pedal vehicle can be pushed in both directions of travel, i.e. forwards and rearwards without causing the pedals to be rotated as a result. When a force is then exerted on the pedals, the force will be transmitted via drive shaft 2 to catch 3 since catch 3 is fixed to shaft 2. Accordingly, this rotation force causes catch 3 to begin to rotate at the same time as drive shaft 2. However, since locking elements 5, 6 are directly positioned on catch 3, the rotational force is immediately transmitted to locking elements 5, 6 such that locking elements 5, 6 are caused to displace outwards and away from the axis of shaft 2. Locking elements 5, 6, however, are nevertheless prevented from rotating yet because they are held by arms 17 of fork 7. This is because fork 7 is prevented from rotating and thus held stationary by reason of the friction which exists between fork 7, and more particularly annular shoulder 22 or fork 7, fiber washer 10, and fixed sleeve 9, respectively. As a result of this frictional retention, locking elements 5, 6 are caused to radially move or displace outwards guided by recesses 15 engaging arms 17 and against the resilient force of annular spring 8. The resilient force for holding locking elements 5, 6 together is accordingly designed to be smaller or less than the frictional force which is exerted between fork 7 and fiber washer 10. The reason for this is because, otherwise, locking elements 5, 6 could not be moved radially outwards. Moreover, as a result of this design, engagement elements or locking elements 5, 6, with their external toothing 20, are positively locked or positively engage with internal toothing 21 of driven hollow shaft 4.

Figure 2:
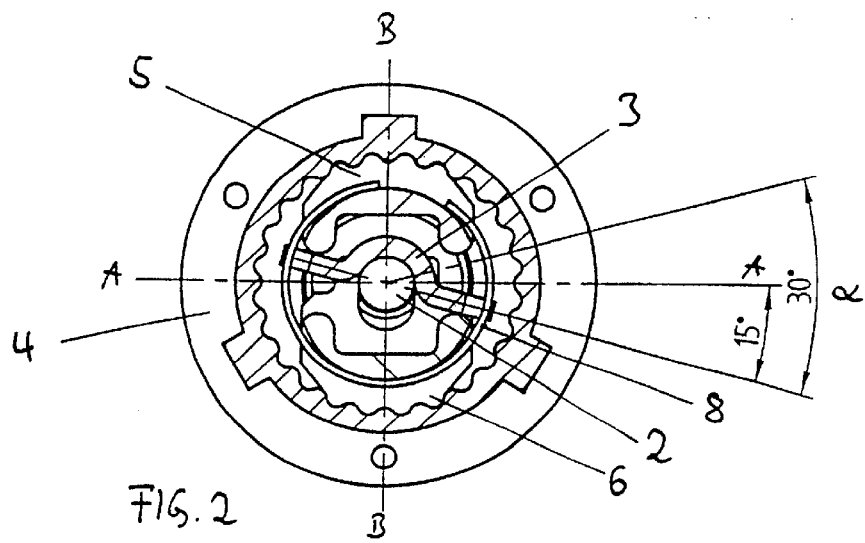
FIG. 2 is a sectional view of the freewheel clutch shown in FIG. 1, in the closed state of the freewheel, e.g., clockwise rotational engagement of the engagement mechanism such that the drive shaft can drive the driven shaft to clockwise rotation.

The force generated by the positive locking or engagement is designed to be greater than the frictional force produced by fiber washer 10 on fork 7. As a result, this allows fork 7 to also begin to rotate together with engagement elements 5, 6 and the drive shaft 2 and the driven shaft 4, respectively, against the frictional resistance on fiber washer 10. Moreover, this design permits a positive power transmission of the force exerted on the pedals to be transmitted to the driven shaft 4. Such an engaged position of freewheel clutch 1 is shown in FIG. 2. Hence, in such an engaged position, the pedal vehicle can be moved forwards or rearwards by way of pedaling.

Note that FIG. 2 shows engagement on one (forward or clockwise) of the two positions.

When a frictional connection (e.g., frictional engagement between teeth 20 and teeth 21) is provided between hollow shaft 4 and engagement elements 5, 6, the frictional force created between hollow shaft 4 and engagement elements 5, 6 must be greater than the frictional force between fork 7 and fiber washer 10, in order to obtain a functioning freewheel clutch.

As is apparent from FIG. 2, catch 3 is in engagement via its two wing sections 23, with a respective one of locking elements 5, 6, e.g., at the upper side and bottom side, respectively. As is clearly seen in comparison to FIG. 3, catch 3 has here been rotated (clockwise) out of an initial position (FIG. 3) along axis A-A by approximately 15° to achieve a full engagement between engagement elements 5, 6 and driven shaft 4. However, it should be noted that if the pedals were to be rotated in the other direction (counterclockwise), catch 3 would be rotated out of the initial position A-A by 15° into the opposite direction (not shown). This would again bring engagement elements 5, 6 into engagement with internal toothing 21 of driven shaft 4 (not shown).

Accordingly, there is an overall motional or rotational play of approximately less than 30° where no power is transmitted from drive shaft 2 to driven shaft 4 such that the freewheel is opened (i.e., non-engaged) in both directions of travel.

Freewheel clutch 1 according to the invention thereby ensures that, when little or no force is exerted on the pedals, a freewheel exists in either a forwardly oriented direction and a rearwardly oriented direction, such that the pedal vehicle can be pushed forwards or rearwards without corresponding movement of the pedals. When a force is then exerted on the pedals in a specific direction, engagement between engagement elements 5, 6 and driven shaft 4 can commence after a predetermined amount of rotational play (e.g. 15° in either direction for a total of approximately 30°). As a result, the force of the pedals can then be transmitted to driven shaft 4.

It should be noted here that the rotational play can especially be varied by adjusting the distance between engagement elements 5, 6 and driven shaft 4. Moreover, the invention is not limited to rotational plays of 15° and/or 30°. However, these plays are believed to be ideal for pedal type devices are therefore recommended.

Freewheeling clutch 1 operates equally well in either direction. Thus, when a force is exerted on the pedals in another direction, e.g. counterclockwise, engagement elements 5, 6 also engage into driven shaft 4 which is then rotated in the rearward direction (not shown). Thus the pedal vehicle can be moved both in the forward and rearward direction by way of pedaling.

Thus, the invention provides for a freewheel clutch 1 which is shiftable in both rotational directions (forwards and/or clockwise and rearward and/or counterclockwise) and includes a double-acting freewheel. Freewheel clutch 1 utilizes a catch 3 which is fixedly and securely connected to a drive shaft 2, and an engagement mechanism having engagement elements 5, 6 arranged between drive shaft 2 and a driven shaft 4. Furthermore, a holding element 7 is utilized which is coupled to or engaged with a fixed member 9 via frictional resistance. Moreover, holding element 7 cooperates with engagement elements 5, 6, via recesses. Additionally, engagement elements 5, 6 are biased towards one another and shaft 2 via a spring element 8. Spring element 8 is designed such that when shaft 2 is in the non-rotating state, engagement elements 5, 6 are out of engagement with driven shaft 4. Moreover, when shaft 2 is in the driven, i.e. rotating, state, spring element 8 is sufficiently weak to allow engagement elements 5, 6 to be in engagement with driven shaft 4 via the catch 3.

It is preferred that most of the parts described herein be made of a material such as steel. Thus it is preferred that shaft 2, shaft 4, elements 5 and 6, catch 3, washers 7, 8 and 11, sleeve 9 and disk 18 all be made of a metal such as steel since it is relatively inexpensive, strong, and relatively easy to work with. However, cover 12 may be made from plastic or composite as well as metal. Moreover, fiber washer 10 may be a combination of a metal washer utilizing a fiber lining or it may be simply made of fiber or similar composite material. Accordingly, the invention is not limited to these so listed materials. Considerations of weight, cost, wear life, and reliability may require that lighter materials be utilized such as aluminum, plastics, and composites and/or a combination thereof.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A freewheel clutch which is shiftable in two rotational directions, the clutch comprising:
   a drive shaft which can rotate in each of two directions;
   a catch element which is fixedly secured to the drive shaft;
   a driven shaft;
   an engagement mechanism arranged between the drive shaft and the driven shaft;
   a fixed member;
   a holding element frictionally engaging the fixed member; and
   a spring element biased to release the engagement mechanism from engagement with the driven shaft,
   wherein a frictional force produced by a frictional engagement between the fixed member and the holding element is greater than a resilient force of the spring element which prevents the engagement mechanism from engaging the driven shaft.

2. The clutch of claim 1, wherein the clutch is a double-acting freewheel clutch.

3. The clutch of claim 1, wherein a force of engagement between the engagement mechanism and the driven shaft is greater than a frictional force produced by the frictional engagement between the fixed member and the holding element.

4. The clutch of claim 1, wherein the clutch comprises a pedal vehicle clutch.

5. The clutch of claim 1, wherein the spring element biases the engagement mechanism towards an axis of the drive shaft.

6. The clutch of claim 1, wherein the engagement mechanism comprises at least two engagement elements.

7. The clutch of claim 6, wherein the spring element biases the at least two engagement elements towards an axis of the drive shaft.

8. The clutch of claim 1, wherein the engagement mechanism comprises a friction engaging surface for frictionally engaging the driven shaft.

9. The clutch of claim 8, wherein the friction engaging surface comprises at least one tooth.

10. The clutch of claim 9, wherein the friction engaging surface comprises a plurality of teeth.

11. The clutch of claim 9, wherein the driven shaft comprises a friction engaging surface having at least one tooth.

12. The clutch of claim 11, wherein the at least one tooth of the driven shaft is adapted to engage the at least one tooth of the engagement mechanism.

13. The clutch of claim 12, wherein rotation of the drive shaft causes corresponding rotation of the driven shaft when the at least one tooth of the engagement mechanism engages the at least one tooth of the driven shaft.

14. The clutch of claim 1, wherein the driven shaft comprises a hollow shaft having one of an internal spline and a plurality of internal teeth.

15. A freewheel clutch which is shiftable in two rotational directions, the clutch comprising:
   a drive shaft which can rotate in each of two directions;
   a catch element which is fixedly secured to the drive shaft;
   a driven shaft;
   an engagement mechanism arranged between the drive shaft and the driven shaft;
   a fixed member;
   a holding element frictionally engaging the fixed member; and
   a spring element biased to release the engagement mechanism from engagement with the driven shaft,
   wherein the spring element comprises one of a spring washer and spring ring.

16. The clutch of claim 15, wherein the spring element comprises one of a split spring washer and split spring ring.

17. The clutch of claim 1, wherein the engagement mechanism comprises one of an external spline and a plurality of external teeth for engaging the driven shaft.

18. The clutch of claim 17, wherein the engagement mechanism comprises at least two engagement elements, each of the at least two engagement elements having one of an external spline and a plurality of external teeth for engaging the driven shaft.

19. A freewheel clutch which is shiftable in two rotational directions, the clutch comprising:
   a drive shaft which can rotate in each of two directions;
   a catch element which is fixedly secured to the drive shaft;
   a driven shaft;
   an engagement mechanism arranged between the drive shaft and the driven shaft;
   a fixed member;
   a holding element frictionally engaging the fixed member; and
   a spring element biased to release the engagement mechanism from engagement with the driven shaft, wherein the catch element comprises a semi-annular section having two lateral wing sections projecting therefrom.

20. The clutch of claim 19, wherein the semi-annular section is fixedly secured to an exterior surface of the drive shaft.

21. The clutch of claim 19, wherein the semi-annular section is fixedly secured to an exterior surface of the drive shaft by one of welding and boding.

22. The clutch of claim 1, wherein the drive shaft is adapted to rotate approximately 15° in a clockwise direction before the engagement mechanism engages the driven shaft.

23. The clutch of claim 1, wherein the drive shaft is adapted to rotate approximately 15° in a counterclockwise direction before the engagement mechanism engages the driven shaft.

24. The clutch of claim 1, wherein the drive shaft is adapted to rotate approximately 15° in each of a clockwise and a counterclockwise direction before the engagement mechanism engages the driven shaft.

25. The clutch of claim 1, wherein the engagement mechanism comprises at least one engagement element, the at least one engagement element including at least one projecting portion.

26. The clutch of claim 25, wherein the at least one projecting portion comprises at least two projecting portions.

27. The clutch of claim 1, wherein rotation of the drive shaft in at least one direction causes the engagement mechanism to engage the driven shaft.

28. The clutch of claim 1, wherein the fixed member comprises a sleeve.

29. The clutch of claim 28, wherein the sleeve comprises an annular shoulder which frictionally engages the holding element.

30. The clutch of claim 29, wherein the sleeve comprises an opening for receiving the drive shaft.

31. The clutch of claim 1, wherein the holding element comprises an annular fork.

32. A freewheel clutch which is shiftable in two rotational directions, the clutch comprising:

a drive shaft which can rotate in each of two directions;

a catch element which is fixedly secured to the drive shaft;

a driven shaft;

an engagement mechanism arranged between the drive shaft and the driven shaft;

a fixed member;

a holding element frictionally engaging the fixed member; and a spring element biased to release the engagement mechanism from engagement with the driven shaft, wherein the holding element comprises an annular fork, and wherein the annular fork comprises a washer portion and at least one arm projecting from the washer section.

33. The clutch of claim 32, wherein the at least one arm is adapted to engage at least one slot in the engagement mechanism.

34. The clutch of claim 33, wherein the at least one arm comprises at least two arms, each of the at least two arms being adapted to engage a corresponding slot in the engagement mechanism.

35. A freewheel clutch which is shiftable in two rotational directions, the clutch comprising:

a drive shaft which can rotate in each of two directions;

a catch element which is fixedly secured to the drive shaft;

a driven shaft;

an engagement mechanism arranged between the drive shaft and the driven shaft;

a fixed member;

a holding element frictionally engaging the fixed member; and a spring element biased to release the engagement mechanism from engagement with the driven shaft; and a friction washer arranged between the holding element and the fixed member.

36. The clutch of claim 35, wherein the friction washer is arranged between the holding element and an annular shoulder of the fixed member.

37. The clutch of claim 35, wherein the friction washer comprises one of a fiber washer and a fiber lined washer.

38. A freewheel clutch which is shiftable in two rotational directions, the clutch comprising:

a drive shaft which can rotate in each of two directions;

a catch element which is fixedly secured to the drive shaft;

a driven shaft;

an engagement mechanism arranged between the drive shaft and the driven shaft;

a fixed member;

a holding element frictionally engaging the fixed member; and a spring element biased to release the engagement mechanism from engagement with the driven shaft; and one of a spring washer and a corrugated washer arranged against the holding member.

39. The clutch of claim 1, further comprising a cover for enclosing the engagement mechanism.

40. A freewheel clutch which is shiftable in two rotational directions, the clutch comprising:

a drive shaft which can rotate in each of two directions;

a catch element which is fixedly secured to the drive shaft;

a driven shaft;

an engagement mechanism arranged between the drive shaft and the driven shaft;

a fixed member;

a holding element frictionally engaging the fixed member; and a spring element biased to release the engagement mechanism from engagement with the driven shaft;

a cover for enclosing the engagement mechanism; and a securing disk for securing the cover to the fixed member.

41. A freewheel clutch which is shiftable in two rotational directions, the clutch comprising:

a first shaft which can rotate in each of two directions;

a second shaft comprising a hollow space, an opening for receiving the first shaft, and an internal friction surface;

an engagement mechanism arranged within the hollow space, the engagement mechanism comprising an external friction surface;

a catch element fixedly secured to the first shaft;

a fixed member comprising an annular shoulder and an opening for receiving the first shaft;

a holding element for frictionally engaging the annular shoulder of the fixed member; and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft, and further comprising a cover for enclosing the engagement mechanism and a securing disk for securing the cover to the fixed member.

42. A freewheel clutch which is shiftable in two rotational directions, the clutch comprising:

a first shaft which can rotate in each of two directions;

a second shaft comprising a hollow space, an opening for receiving the first shaft, and an internal friction surface;

an engagement mechanism arranged within the hollow space, the engagement mechanism comprising an external friction surface;

a catch element fixedly secured to the first shaft;

a fixed member comprising an annular shoulder and an opening for receiving the first shaft;

a holding element for frictionally engaging the annular shoulder of the fixed member; and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft, and further comprising:

a friction washer arranged between the holding element and the annular shoulder of the fixed member, the friction washer comprises one of a fiber washer and a fiber lined washer, one of a spring washer and a corrugated washer arranged against the holding member;

a cover for enclosing the engagement mechanism; and a securing disk for securing the cover to the fixed member, wherein the holding element comprises an annular fork, the annular fork comprising a washer portion and at least two arms, each of the at least two arms being adapted to engage a corresponding slot in the engagement mechanism.

43. A freewheel clutch which is shiftable in two rotational directions, the clutch comprising:

a first shaft which can rotate in each of two directions;

a second shaft comprising a hollow space, an opening for receiving the first shaft, and an internal friction surface;

an engagement mechanism arranged within the hollow space, the engagement mechanism comprising an external friction surface;

a catch element fixedly secured to the first shaft;

a fixed member comprising an annular shoulder and an opening for receiving the first shaft;

a holding element for frictionally engaging the annular shoulder of the fixed member; and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft, and wherein a frictional force produced by a frictional engagement between the fixed member and the holding element is greater than a resilient force of the spring element which prevents the engagement mechanism from engaging the second shaft.

44. The clutch of claim 43, wherein the clutch is a double-acting freewheel clutch.

45. The clutch of claim 43, wherein a force of engagement between the engagement mechanism and the second shaft is greater than a frictional force produced by the frictional engagement between the fixed member and the holding element.

46. The clutch of claim 43, wherein the clutch comprises a pedal vehicle clutch.

47. The clutch of claim 43, wherein the engagement mechanism comprises at least two engagement elements.

48. The clutch of claim 43, wherein the external friction surface comprises at least one tooth.

49. The clutch of claim 48, wherein the at least one tooth comprises a plurality of teeth.

50. The clutch of claim 48, wherein the internal friction surface comprises one of an internal spline and a plurality of teeth.

51. The clutch of claim 50, wherein the at least one tooth of the engagement mechanism is adapted to engage one of the internal spline and the plurality of teeth.

52. The clutch of claim 51, wherein rotation of the first shaft causes corresponding rotation of the second shaft when the at least one tooth of the engagement mechanism engages one of the internal spline and the plurality of teeth of the second shaft.

53. A freewheel clutch which is shiftable in two rotational directions, the clutch comprising:

a first shaft which can rotate in each of two directions;

a second shaft comprising a hollow space, an opening for receiving the first shaft, and an internal friction surface;

an engagement mechanism arranged within the hollow space, the engagement mechanism comprising an external friction surface;

a catch element fixedly secured to the first shaft;

a fixed member comprising an annular shoulder and an opening for receiving the first shaft;

a holding element for frictionally engaging the annular shoulder of the fixed member; and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft, and wherein the spring element comprises one of a split spring washer and a split spring ring.

54. The clutch of claim 43, wherein the engagement mechanism comprises at least two engagement elements, each of the at least two engagement elements comprising the external friction surface, the external friction surface further comprising one of an external spline and a plurality of external teeth for engaging a corresponding spline or teeth disposed on the internal friction surface of the second shaft.

55. A freewheel clutch which is shiftable in two rotational directions, the clutch comprising:

a first shaft which can rotate in each of two directions;

a second shaft comprising a hollow space, an opening for receiving the first shaft, and an internal friction surface;

an engagement mechanism arranged within the hollow space, the engagement mechanism comprising an external friction surface;

a catch element fixedly secured to the first shaft;

a fixed member comprising an annular shoulder and an opening for receiving the first shaft;

a holding element for frictionally engaging the annular shoulder of the fixed member; and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft, and wherein the catch element comprises a semi-annular section having two lateral wing sections projecting therefrom.

56. The clutch of claim 55, wherein the semi-annular section is fixedly secured to an exterior surface of the first shaft by one of welding and boding.

57. The clutch of claim 43, wherein the first shaft is adapted to rotate approximately 15° in a clockwise direction before the engagement mechanism engages the second shaft.

58. The clutch of claim 43, wherein the first shaft is adapted to rotate approximately 15° in a counterclockwise direction before the engagement mechanism engages the second shaft.

59. The clutch of claim 43, wherein the first shaft is adapted to rotate approximately 15° in each of a clockwise and a counterclockwise direction before the engagement mechanism engages the second shaft.

60. The clutch of claim 43, wherein the engagement mechanism comprises at least one engagement element, the at least one engagement element including at least one projecting portion.

61. The clutch of claim 60, wherein the at least one projecting portion comprises at least two projecting portions.

62. A freewheel clutch which is shiftable in two rotational directions, the clutch comprising:

a first shaft which can rotate in each of two directions;

a second shaft comprising a hollow space, an opening for receiving the first shaft, and an internal friction surface;

an engagement mechanism arranged within the hollow space, the engagement mechanism comprising an external friction surface;

a catch element fixedly secured to the first shaft;

a fixed member comprising an annular shoulder and an opening for receiving the first shaft;

a holding element for frictionally engaging the annular shoulder of the fixed member; and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft, and wherein the holding element comprises an annular fork, the annular fork comprising a washer portion and at least one arm projecting from the washer portion.

63. The clutch of claim 62, wherein the at least one arm is adapted to engage at least one slot in the engagement mechanism.

64. The clutch of claim 63, wherein the at least one arm comprises at least two arms, each of the at least two arms being adapted to engage a corresponding slot in the engagement mechanism.

65. A freewheel clutch which is shiftable in two rotational directions, the clutch comprising:

a first shaft which can rotate in each of two directions;

a second shaft comprising a hollow space, an opening for receiving the first shaft, and an internal friction surface;

an engagement mechanism arranged within the hollow space, the engagement mechanism comprising an external friction surface;

a catch element fixedly secured to the first shaft;

a fixed member comprising an annular shoulder and an opening for receiving the first shaft;

a holding element for frictionally engaging the annular shoulder of the fixed member; and a spring element for biasing the engagement mechanism towards the first shaft so as to prevent the external friction surface of the engagement mechanism from engaging the internal friction surface of the second shaft, wherein rotation of the first shaft in at least one direction causes a corresponding rotation of the second shaft, and further comprising a friction washer arranged between the holding element and the annular shoulder of the fixed member.

66. The clutch of claim 65, wherein the friction washer comprises one of a fiber washer and a fiber lined washer.

67. The clutch of claim 43, further comprising one of a spring washer and a corrugated washer arranged against the holding member.

68. The clutch of claim 43, further comprising a cover for enclosing the engagement mechanism.

69. A freewheel clutch which is shiftable in two rotational directions, the clutch comprising:

a drive shaft which can rotate in each of two directions;

a catch element which is fixedly secured to the drive shaft;

a driven shaft;

an engagement mechanism arranged between the drive shaft and the driven shaft;

a fixed member;

a holding element frictionally engaging the fixed member; and a spring element biased to release the engagement mechanism from engagement with the driven shaft, wherein the engagement mechanism comprises at least one engagement element, the at least one engagement element including at least one projecting portion, and wherein the at least one projecting portion comprises a stop for preventing the catch element from moving in the axial direction.

70. A method of transmitting power from a drive shaft to a driven shaft utilizing a freewheel clutch which is shiftable in two rotational directions wherein the drive shaft is rotatable in each of two directions, the clutch including a catch element which is fixedly secured to the drive shaft, an engagement mechanism arranged between the drive shaft and the driven shaft, a fixed member, a holding element frictionally engaging the fixed member, and a spring element biased to release the engagement mechanism from engagement with the driven shaft, the method comprising:

rotating the drive shaft from a freewheel position in one of a clockwise and a counterclockwise direction, whereby the engagement mechanism is moved into an engagement position so as to rotate the driven shaft; and returning the drive shaft to the freewheel position, wherein a frictional force produced by a frictional engagement between the fixed member and the holding element is greater than a resilient force of the spring element which prevents the engagement mechanism from engaging the driven shaft.

71. The method of claim 70, wherein the drive shaft is rotatable in each of the clockwise and counterclockwise direction.

72. The method of claim 70, wherein the driven shaft is freely rotating in one of the clockwise and the counterclockwise direction prior to the rotating of the drive shaft.

* * * * *